United States Patent [19]

O'Neil et al.

[11] Patent Number: 6,085,287
[45] Date of Patent: Jul. 4, 2000

[54] METHOD AND APPARATUS FOR ENHANCING THE DISK CACHE PROCESS BY DYNAMICALLY SIZING PREFETCH DATA ASSOCIATED WITH READ REQUESTS BASED UPON THE CURRENT CACHE HIT RATE

[75] Inventors: John T. O'Neil, Key Biscayne; Ben Israel, Boca Raton, both of Fla.

[73] Assignee: Genesis One Technologies, Inc., Boca Raton, Fla.

[21] Appl. No.: 09/221,632

[22] Filed: Dec. 23, 1998

Related U.S. Application Data

[60] Provisional application No. 60/070,195, Dec. 30, 1997.

[51] Int. Cl.[7] .................................................. G06F 12/00
[52] U.S. Cl. ............................ 711/113; 711/137; 712/207
[58] Field of Search .................................... 711/137, 204, 711/213, 113, 114, 112, 118; 712/237, 207

[56] References Cited

U.S. PATENT DOCUMENTS

| | | | |
|---|---|---|---|
| 3,928,857 | 12/1975 | Carter et al. | 711/137 |
| 5,133,060 | 7/1992 | Weber et al. | 711/113 |

(List continued on next page.)

FOREIGN PATENT DOCUMENTS

| | | |
|---|---|---|
| 2-18645 | 1/1990 | Japan . |
| 4-21043 | 1/1992 | Japan . |
| 4-21044 | 1/1992 | Japan . |
| 5-189286 | 7/1993 | Japan . |

OTHER PUBLICATIONS

Cache—PC Webopaedia Definition and Links, Copyright 1998 Mecklermedia Corp., downloaded from website (webopedia.internet.com/TERM/c/cache.html) on Dec. 6, 1998, 3 pages.

(List continued on next page.)

*Primary Examiner*—Glenn Gossage
*Attorney, Agent, or Firm*—Akin, Gump, Strauss, Hauer & Feld, L.L.P.

[57] ABSTRACT

The performance of a disk cache subsystem is enhanced by dynamically sizing read requests based upon the current disk cache hit rate. Any data requested in the read request which is not the immediately requested data is located adjacent to the immediately requested data. Accordingly, the size of the read request depends upon at least one variable factor other than the size of the requested data. More specifically, the size of the read request is reduced as the disk cache hit rate declines, and the size of the read request is increased as the disk cache hit rate increases. Short-term and long-term disk cache hit rates are tracked. The short-term disk cache hit rate is used to determine the reduction in the size of the read request, and the long-term disk cache hit rate is used to determine the increase in the size of the read request. The read request is a read-around request formulated to obtain the immediately requested data, plus additional data which is not requested and which is located before and after the immediately requested data. When reading data in a computer system that includes a disk and a disk cache in communication with the disk, the computer system runs an application program which makes a first read request whenever it needs data to execute the program. The first read request is received in a disk cache enhancer and in a disk cache manager. The disk cache manager includes disk cache which is the disk cache of the computer system. The requested data is provided to the application program from the disk cache if the requested data is currently in the disk cache. A second read request is formulated by the disk cache enhancer if the requested data is detected as not currently being in the disk cache. The second read request is the dynamically sized read request. When used in a Windows® operating system environment, the initial read-around value is about 1 megabyte.

20 Claims, 3 Drawing Sheets

Microfiche Appendix Included
(1 Microfiche, 21 Pages)

U.S. PATENT DOCUMENTS

| Number | Date | Inventor | Class |
|---|---|---|---|
| 5,146,578 | 9/1992 | Zangenehpour | 711/137 |
| 5,289,581 | 2/1994 | Berenguel et al. | 711/113 |
| 5,293,609 | 3/1994 | Shih et al. | 711/137 |
| 5,325,509 | 6/1994 | Lautzenheiser | 711/137 |
| 5,361,391 | 11/1994 | Westberg | 711/137 |
| 5,367,656 | 11/1994 | Ryan | 711/213 |
| 5,452,440 | 9/1995 | Salsburg | 711/136 |
| 5,485,609 | 1/1996 | Vitter et al. | 711/137 |
| 5,526,511 | 6/1996 | Swenson et al. | 711/134 |
| 5,537,573 | 7/1996 | Ware et al. | 711/137 |
| 5,557,767 | 9/1996 | Sukegawa | 711/113 |
| 5,566,315 | 10/1996 | Milillo et al. | 711/113 |
| 5,581,736 | 12/1996 | Smith | 711/170 |
| 5,588,128 | 12/1996 | Hicok et al. | 711/137 |
| 5,600,817 | 2/1997 | Macon, Jr. et al. | 711/137 |
| 5,623,700 | 4/1997 | Parks et al. | 710/53 |
| 5,649,153 | 7/1997 | McNutt et al. | 711/118 |
| 5,704,053 | 12/1997 | Santhanam | 712/207 |
| 5,752,272 | 5/1998 | Tanabe | 711/171 |
| 5,890,211 | 3/1999 | Sokolov | 711/113 |

OTHER PUBLICATIONS

"Layers of Cache", Copyright 1997–99 Charles M. Kozierok, downloaded from The PC Guide website (www.pcguide.com/ref/mbsys/cache/layers–c.html) on Dec. 17, 1998, 2 pages.

Hard Disk External Performance Factors, Copyright 1997–99 Charles M. Kozierok, downloaded from The PC Guide website (www.pcguide.com/ref/hdd/perf/ext–c.html) on Dec. 17, 1998, 5 pages.

METHOD AND APPARATUS FOR ENHANCING THE DISK CACHE PROCESS BY DYNAMICALLY SIZING PREFETCH DATA ASSOCIATED WITH READ REQUESTS BASED UPON THE CURRENT CACHE HIT RATE

This application claims the benefit of U.S. Provisional Application No. 60/070,195 filed Dec. 30, 1997, entitled "DISK CACHE ENHANCER."

REFERENCE TO MICROFICHE APPENDIX

This application includes a microfiche appendix of one (1) sheet of microfiche having twenty-one (21) frames.

BACKGROUND OF THE INVENTION

Cache is a storage area that keeps frequently accessed data or program instructions readily available so that data or program instructions (both referred to hereafter, as "data") used by a computer do not have to be repeatedly retrieved from a secondary storage area. In one typical scheme, cache is a form of random access memory (RAM) which can be directly and quickly accessed by the computer's processor. In contrast to cache, a computer also includes one or more secondary storage areas, typically disk devices, which can only be accessed through an input/output (I/O) device, thereby providing much slower access time than the cache. Ideally, a computer would run entirely from data stored in RAM-type cache. However, RAM is very expensive relative to disk memory. Thus, a small amount of cache is provided in the computer (relative to memory capacity of the disks) to improve overall performance of the computer.

FIG. 1 shows a prior art computer system 10 which uses cache. The cache in FIG. 1 is "software cache" or "disk cache" which is designed to store data and program instructions which are frequently accessed from a disk drive or tape drive. The system 10 is shown with an application software program 12 running and issuing I/O requests to a cache manager 14. The cache manager 14 retains data recently accessed from one or more physical disks, collectively referred to as disk 16, which data is stored in cache 18 within the cache manager 14. If the program 12 requests data which exists in the cache 18, the data is retrieved directly from the cache 18 and no read request for the data is sent to the disk 16. However, if the requested data is not in the cache 18, the cache manager 14 issues an I/O read request to the disk 16, resulting in a seek and transfer of data from the disk 16 into the cache 18. Then, the cache manager 14 copies the data (now stored in the cache 18 for potential subsequent use) into the memory of the application program 12 (not shown) for immediate use.

In one conventional system 10, the cache 18 is divided into "pages" and the data in the cache 18 includes pages of one or more application program instructions and/or pages of data used by the one or more programs. When the application program 12 requests a page, and the page is not in the cache 18, a "page fault" occurs. Upon the occurrence of a "page fault," the cache manager 14 transmits a disk read request to the disk 16 to retrieve the page. The retrieved page is forwarded to the application program 12 and is cached for potential subsequent use.

The "cache hit rate" is a measure of the percentage of times that the requested data is available in the cache 18, and, thus, does not need to be retrieved from the disk 16. Disk drive life and program execution speed will improve as the cache hit rate increases, since read requests cause physical wear and since data access time from cache is typically significantly faster than data access time from a disk. Many schemes have been developed to optimize the disk cache process so as to minimize the number of seek and read requests for data stored on the disk 16. Some schemes affect how the cache 18 is "populated" or "primed" with data. Other schemes are used to decide which data should be purged from the cache 18 as the space in the cache 18 becomes filled. Still other schemes are used to decide how to share valuable computer RAM between virtual memory and disk cache. U.S. Pat. No. 5,581,736 (Smith), which is incorporated by reference in its entirety herein, is one example of the latter scheme.

One conventional scheme to improve the cache hit rate is to pre-read additional, unrequested data whenever a disk read request occurs. More specifically, this scheme reads the requested data from the disk, as well as a small amount of additional data on the disk which follows the requested data. This scheme is based on the fact that data which is physically stored on the disk after the requested data is oftentimes likely to be needed shortly after the requested data is needed. The amount of additional, unrequested data that is read from the disk is called the "read ahead size." One conventional disk caching subsystem provided in Microsoft Windows® has a small, fixed read-ahead size which can be preset by the user up to a maximum value of 64 kilobytes (64 K). For example, if the read-ahead size is 64K and 10K of data must be retrieved from the disk because it is immediately needed and is not present in the cache, then 74K of data is retrieved and cached. The 74K of data consists of the requested 10K, plus the subsequent 64K of data on the disk. Likewise, if the read-ahead size is 64K and 100K of data must be retrieved from the disk because the 100K of data is immediately needed and is not present in the cache, then 164K of data is retrieved and cached. Some disadvantages of this scheme are as follows:

(1) The maximum read-ahead size is very small, thereby limiting the amount of additional data that is pre-read into the cache for potential subsequent use.

(2) The read-ahead size is fixed and thus cannot dynamically change based upon system performance.

(3) The additional read data (i.e., read-ahead data) is always data which follows the requested data. In some instances, a program is likely to need data which precedes the requested data. In the conventional scheme, a separate disk read must be performed to obtain the preceding data unless the preceding data was coincidentally captured as part of the read-ahead data associated with a different prior disk read operation.

Despite the many schemes for improving and optimizing disk cache performance, there is still a need to further improve and optimize performance, and thus further reduce the number of disk read requests. The present invention fulfills this need.

BRIEF SUMMARY OF THE PRESENT INVENTION

A method is provided of reading data in a computer system, wherein the computer system includes a storage device and a cache in communication with the storage device. The method comprises tracking a cache hit rate of the computer system, detecting a request for data which is immediately requested by the computer system but which is not currently present in the cache, formulating a read request to obtain the requested data from the storage device, and dynamically sizing the read request based upon the current cache hit rate. The size of the read request is related to the cache hit rate in a manner such that the size of the read request is reduced as the cache hit rate declines, and the size of the read request is increased as the cache hit rate increases. Short-term and long-term cache hit rates are tracked. The short-term cache hit rate is used to determine the reduction in the size of the read request, and the long-term cache hit rate is used to determine the increase in the size of the read request.

BRIEF DESCRIPTION OF THE DRAWINGS

The following detailed description of preferred embodiments of the invention would be better understood when read in conjunction with the appended drawings. For the purpose of illustrating the invention, there is shown in the drawings embodiments which are presently preferred. It should be understood, however that the invention is not limited to the precise arrangements and instrumentalities shown. In the drawings.

DETAILED DESCRIPTION OF THE INVENTION

Figure 1:
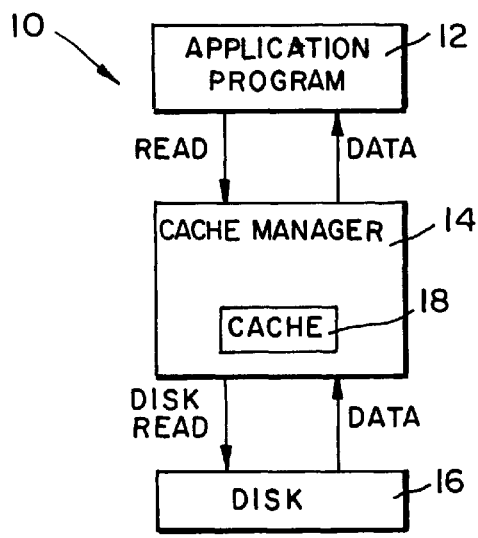
FIG. 1 is a schematic block diagram of a computer system using a conventional disk caching scheme.

Certain terminology is used herein for convenience only and is not to be taken as a limitation on the present invention. In the drawings, the same reference numerals are employed for designating the same elements throughout the several figures.

Figure 2:
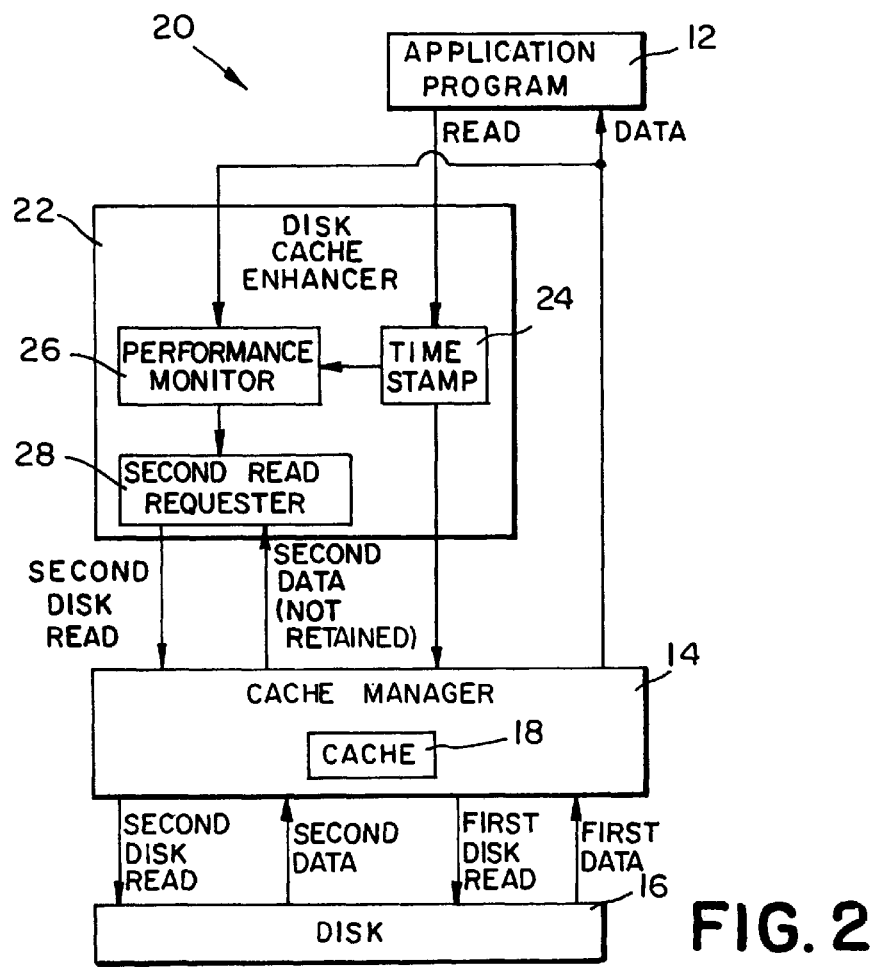
FIG. 2 is a schematic block diagram of a computer system using a disk caching scheme in accordance with a first embodiment of the present invention.

FIG. 2 is a schematic block diagram of a disk caching scheme in accordance with a first embodiment of the present invention. Referring to FIG. 2, system is similar in many respects to the conventional system 10 of FIG. 1, except that the system 20 includes an additional element, namely, a disk cache enhancer 22 (hereafter, DCE 22). The DCE 22 functions as an add-on device to the conventional system 10 and does not interfere with the normal operation of the conventional system 10. Instead, the DCE 22 generates additional commands in the form of second disk reads to the cache manager 14 to improve the hit rate of the cache 18. One conventional system 10 suitable for use with the system 20 is the disk cache subsystem of Windows® 95, Windows® 98, or Windows® NT all products of Microsoft corp., Redmond, Wash.

The DCE 22 includes a time stamp 24 for incoming read requests; a performance monitor 26 for tracking a long-term cache hit rate, a short-term cache hit rate, disk transfer rate, average seek time, and other statistics; and a second read requester 28 for initiating second disk read requests.

The system 20 operates as follows:

(1) When the application program 12 needs data, a read request is transmitted from the program 12.

(2) The DCE 22 receives the read request, time stamps the read request, and forwards the read request unchanged to the cache manager 14.

(3) The cache manager 14 processes the read request in a conventional manner, as described above. Thus, if the requested data currently exists in the cache 18, the data is retrieved directly from the cache 18 and is sent to the memory of the application program 12 (memory not shown) for immediate use, and no read request for the data is sent to the disk 16. However, if the requested data is not in the cache 18, the cache manager 14 issues an I/O read request to the disk 16, resulting in a seek and transfer of data (referred to as "first data" in FIG. 2) from the disk 16 into the cache 18. Then, the cache manager 14 copies the data (now stored in the cache 18 for potential subsequent use) into the memory of the application program 12 (memory not shown) for immediate use. The read request transmitted by the cache manager 14 may also obtain additional data as part of the first data based upon the preset read-ahead size, as discussed in the background section above.

(4) Shortly after execution of the operations in (3), the performance monitor 26 of the DCE 22 uses the read request time stamp and the arrival time of the data to determine if the current read request resulted in a cache hit or cache miss. A "hit" is detected if the data transmitted to the program 12 arrives faster than a preset time period (i.e., if the read is completed quickly), and a "miss" is detected if the data transmitted to the program 12 arrives slower than the preset time period (i.e., if the read is not completed quickly). The preset time period is based upon known cache access and disk access times. The "hit" or "miss" status, as well as the data arrival times are used to update the long-term cache hit rate, short-term cache hit rate, disk transfer rate, average seek time, and other statistics kept by the performance monitor 26.

(5) If a "hit" is detected in the DCE 22, no further action is taken by the DCE 22 other than to update the statistics.

(6) If a "miss" is detected by the DCE 22, the DCE 22 formulates a second logical disk read from the second read requester 28 and issues it to the cache manager 14 to prime the cache 18 and improve the subsequent hit rate. The second disk read is "dynamically sized" based upon the current cache hit rate. The "current cache hit rate" is a moving average of the cache hit rate over time. "Dynamically sized" means that the size of the second read request depends upon at least one variable factor other than the size of the requested data which is inherently variable. The second disk read is preferably a "read-around" request formulated to include the data requested in the original read request, plus additional data which is not immediately requested and which is located before the starting point and after the end point of the immediately requested data. The second read request thus differs in at least two significant ways from the conventional read request. First, the size of the additional data requested in the second read request is variable, instead of being fixed in the conventional scheme. Second, the data includes data located before and after the required data, instead of only after as in the conventional scheme. Furthermore, depending upon the current cache hit rate, the size of the additional data requested in the second read request will typically be significantly larger than the size of additional data requested in a conventional scheme, and thus may alternatively be referred to as a "Big Read" (see FIG. 3). For example, the second read request might ask for an amount of data in the megabyte range, compared to a maximum of 64K in a conventional Windows scheme. In an alternative, but less preferred embodiment of the present invention, the second read request is a dynamically sized conventional read-ahead request, not a read-around request.

(7) The second disk read request is received by the cache manager 14 and processed in the same manner as a conventional read request. That is, the cache manager 14 checks to see if the data in the second disk read currently exists in the cache 18. If so, no read request for the data is sent to the disk 16 and no further action is taken by the cache manager 14 or the DCE 22, other then to update cache hit rate statistics. However, if all of the data in the second disk read is not currently in the cache 18, the cache manager 14 issues an I/O read request to the disk 16, resulting in a seek and transfer of data (labeled as "second data" in FIG. 2) from the disk 16 into the cache 18 for potential subsequent use. The cache manager 14 also forwards the data to the DCE 22 (the requester) as part of its normal protocol. The DCE 22 receives the data but does not store it.

In most disk drive implementations of the present invention, the second disk read request usually results in a cache miss and a subsequent disk read, since it is unlikely that the cache 18 contains all of the typically large amounts of additional requested data. The subsequent disk read typically occurs efficiently because the mechanical arm of the disk drive is already at or close to the desired reading location due to the previously executed disk read of data associated with the original read request As noted above, the dynamically sized second read request is based upon the current cache hit rate. More specifically, the size of the second read request is related to the cache hit rate in a manner such that the size of the read request is reduced as the cache hit rate declines, and the size of the read request is increased as the cache hit rate increases. Preferably, the size of the second read request is further dependent upon the short-term cache hit rate and the long-term cache hit rate wherein the short-term cache hit rate is used to determine the reduction in the size of the read request, and the long-term cache hit rate is used to determine the increase in the size of the read request. The short-term/long-term scheme produces a hysteresis response in the second read request size and allows for more stable and rapid adaptation. One suitable algorithm for determining the size of the second read request, as expressed in C programming language derived directly from the source code Appendix below, is as follows:

```
int xn0; // current max readahead size from cache table
int xn; // current readahead size
int xnMax=Nmax; // current physical readahead buffer size
// if less than xn and Nmax, multiple [pre]reads are done qq[slower?]
int xlen=1<<Nmax, xmsk=-1<<Nmax; char *xbuf=0;
int fastaverage=0,slowaverage=0; // no misses
#define MissShft 30
#define one (1<<MissShft)
void xnset(int new_xn) {static int xn0=0;
if(xn0_!=xnMax) {xn0_=xnMax; xfree(xbuf);
phys_buf_len=1<<xnMax;
xbuf=malloc(phys_buf_len);
}
if(new_xn>xn0 || new_xn<1) return;
if(xn!=new_xn) {xn=new_xn; xlen=1<<xn; xmsk=-1<<xn;
if (debugging && postread) seeMiss();
}
}
int freePgs, unlockedPgs, cachePgs,chngs;
int bigread,bigreads;
int tab[]={14000,21,13000,20,12000,19,11000,18,9000,17,0,0};
// first entry of each pair is cache size required for second entry readahead
// setting entry 1 to 0 always forces xn0 to second entry
//
void check_cache_size() {int i,p;
freePgs = GetFreePageCount(0,&unlockedPgs);
cachePgs=VCache_GetSize(0,0);
p=(cachePgs*4096)/K;
for(i=0; tab[i]; i+=2) {if(p>=tab[i]) {xn0=tab[i+1]; break;}}
```

-continued

```
if (xn0<Nmin) xn0=Nmin;
if (xn0<xn) xnset(xn0); // ok to be greater
}
#define MissSzMax 10
int max_miss[2][Nmax+1];
// max allowable miss rate for each readahead size
int min_miss[2][Nmax+1];
// increase readcheck_cache_size size if below this
int minMiss[MissSzMax],maxMiss[MissSzMax];
// above are decayed averages of misses
int sensitivity=3;
void doMiss(int m) {int i,n=0; // m=0[hit?] or 1[miss]
fastaverage=fastaverage-(fastaverage>>sensitivity);
slowaverage=slowaverage-(slowaverage>>(sensitivity+3));
if (m) {// reduce readcheck_cache_size possibly
fastaverage += one>>sensitivity;
slowaverage += one>>(sensitivity+3);
if (slowaverage>max_miss[0][xn]) {
if(xn>0) xnset(xn-1); // fight reducing
}
}
else {// increase read ahead size possibly
if (fastaverage<min_miss[0][xn]) xnset(xn+1); // quick increase
}
}
void set_up_internal_tables() {int i;
for (i=0; i<=Nmax; i++) {// calculate miss rate thresholds
max_miss[0][i]=one/4+one/(1+i);
min_miss[0][i]=max_miss[0][i]*2/3;
}
check_cache_size();
xnset(xn0); //
}
int ramspeed=1; // 10*2^19 bytes per millisec
void calibrate_cache_copy_time(1ength) {int n=1;
char *buf1=0; int t1,t2;
for (;length>=1024; length/=2, n*=2) {
if(!buf1) buf1=(char*)malloc(length); // lots of ram
else {
t1 = getTime();
{int i=0; for(;i<n; i++) {memcpy(buf1,buf1+length/2,length/2);}}
t2 = getTime();
ramspeed=(length*n)/(t2-t1);
}
}
xfree(buf1);
}
handle_the_io() {
if (it_is_a_simple_read) {
int sfn=pir->ir_sfn, pos=pir->ir_pos; // save stuff
int iolenv,len,pos2=0,len2=0,err,pid=pir->ir_id;
ioreq io; pioreq p=io;
io=pir; // copy the io request
t0 = getTime(); // time stamp
iolenv=pir->ir_length; // attempted
ret = (*PrevHook)(pfn, fn, Drive, ResType, CodePage, pir); // do the io
dt2 = getTime()-t0; // elapsed time
len=pir->ir_length; err=pir->ir_error;
dt0=1+2*len/ramspeed; // time it would take to copy from cache
if(dt2>dt0 && !err) {// we have a miss
pos2 = io.ir_pos&=xmsk; // adjust start for read_around
if (xn>=Nmin) {// read more
io.ir_length = phys_buf_len io.ir_data=xbuf;
(*PrevHook)(pfn, fn, Drive, ResType, CodePage, p); // do bigread
}
len2=io.ir_length; // what we [would have] reread in
check_cache_size();
doMiss(len2!=0); // update fast and slow averages, adju
}
else {//just pass it on
ret = (*PrevHook)(pfn, fn, Drive, ResType, CodePage, pir);
}
}
}
```

When an application program 12 randomly reads small records in different areas of the disk 16, the hit rate declines and the pre-read size is reduced, eventually becoming zero. When the pre-read size is zero, the DCE 22 provides no performance improvement in the system 20. However, most application programs 20 read related data most of the time, and the present invention detects that situation and dynamically enlarges the pre-read amount to a large number (e.g., typically 1 megabyte) in comparison to conventional schemes, such as Windows® built-in cache routine which allows for a fixed, user-selected pre-read size up to 64K.

The present invention is based on the theory that if large reads are resulting in a high cache hit rate, then the system should continue performing large reads and should even increase the size of the reads. If the even larger reads further increase the cache hit rate, then the system should try even larger reads, and so on. Likewise, if large reads are not resulting in a high cache hit rate, then the system should stop performing large reads, since the large reads consume system resources without providing any significant benefit. Simply stated, if the action has great results, do more of it, and if the action has poor results, do less of it.

Upon initialization of the system 20, the pre-read size is preferably set to about 1 megabyte. Since the DCE 22 does not affect the normal operation of the cache manager 14, the cache manager 14 continues to pre-read data according to the user preset value, even if the pre-read size output by the DCE 22 becomes reduced to zero as a result of a long period of a very low cache hit rate.

The read-around scheme preferably starts the read at a number of bytes which is the largest integral multiple of the read-ahead size that is less than or equal to the original I/O starting address. For example, if the original I/O starting address requested by the application program 12 is address 1,000,001, and the read-ahead size is currently 0.5 megabytes, then the addresses which are read for caching purposes are: 1,000,000 to 1,499,999. One advantage of this scheme is that the pre-read data always pieces together to create the desired file while minimizing overlapping portions.

Figure 3:
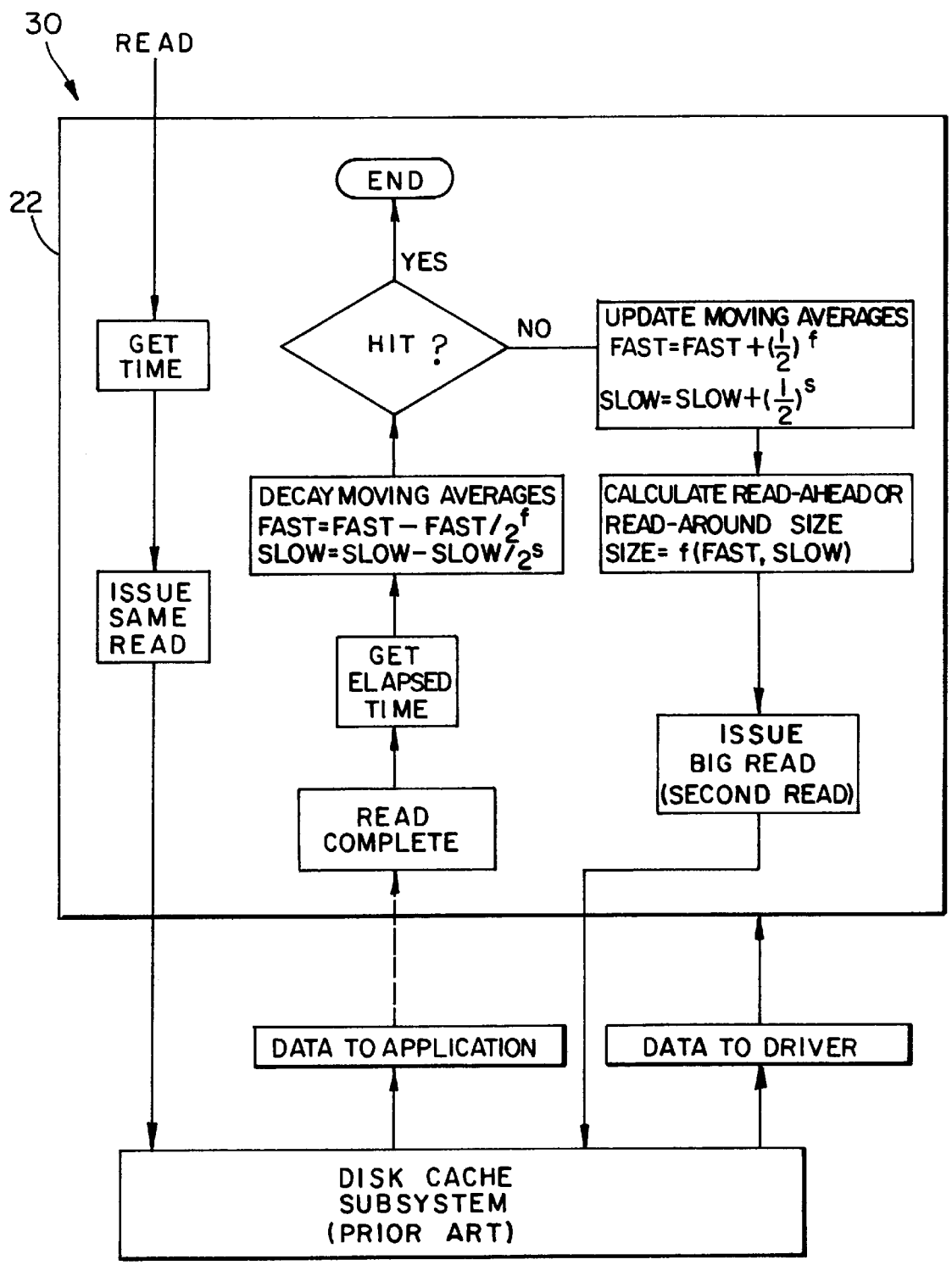
FIG. 3 is a combined functional flowchart and schematic block diagram of computer system using a the disk caching scheme of the present invention.

FIG. 3 is a combined functional flowchart/schematic block diagram 30 of the disk caching scheme of FIG. 2. In view of the discussion above, FIG. 3 is self-explanatory and thus is not described in further detail herein. However, it is noted that the short-term cache hit rate is referred to in FIG. 3 as the FAST moving average, and the long-term cache hit rate is referred to in FIG. 3 as the SLOW moving average.

PERFORMANCE RESULTS OF PRESENT INVENTION

An important industry performance measure is the Ziff-Davis "WINBENCH" test suite, which is widely quoted when comparing the cost performance of various manufacturers' personal computers. The present invention improves the performance of the "Business WinDisk" section of the WinBench tests from 30 to 100 percent, depending on the available hardware resources. The most important resource is the amount of internal memory allocated for disk caching. More modern systems with faster clock speeds and faster disk transfer rates tend to show greater improvement in this regard due to the use of the present invention.

Another important improvement is in reduced program loading time for large programs that are page faulted in. This is best explained in the context of Windows® 95, Windows® 98 and Windows® NT. Consider, for example, the start-up of a 1 megabyte program. First, the operating system places information about the whole program in the page table, but the program itself is not read into memory. The operating system then attempts to execute the first instruction, causing a page fault. The missing page (which is only 4K) is then read in from the disk cache. The program is allowed to run until another page fault occurs, and the process continues until an initial "working set" of pages is in virtual memory. Thereafter, the program can run with a relatively small number of page faults.

Significant time can be expended if the disk caching subsystem performs a physical seek and a read for each page being faulted in. Windows therefore reads in a small fixed amount (under user control up to 64K) of additional data and places that data into the cache in case it is required shortly by another page fault. In this situation, the present invention detects the cache miss and reads in a larger section of the program, including parts of the program preceding the page fault, forcing more data into the cache. This has the effect of reducing the loading time of programs such as NETSCAPE by half in a typical configuration.

A further performance improvement is also caused by the present invention as a result of the improved hit rate. Windows® also monitors the hit rate and adjusts the cache size, as described in U.S. Pat. No. 5,581,736 (Smith). The present invention, when practiced with the Smith scheme, causes Windows to allocate more memory to the cache, thereby resulting in a further performance improvement.

HARD DISK RELIABILITY IMPROVEMENTS RESULTING FROM USE OF THE PRESENT INVENTION

The main failure mode of hard disks occurs during seeks. The present invention significantly reduces the number of seeks. For example, the Ziff-Davis benchmark previously mentioned contains snapshots of activity caused by common personal computer programs including MS-OFFICE, LOTUS, EXCEL, MS WORD, POWER POINT and others. This activity contains about 52,000 reads which normally causes 12,000 seeks. The present invention reduces the seeks to 2,140 seeks. The reduced seeks translates into a substantial improvement in disk lifetime.

The DCE 22 is preferably implemented as a software driver. The DCE 22 may be installed as a device driver with any Windows® 95, Windows® 98, Windows® NT operating system, or the like.

The present invention is particularly useful in computer applications that make extensive use of disk reads. However, the scope of the invention includes systems wherein the disk 16 is another form of a storage device, such as a tape drive. More generally, the storage device may be any type of memory which is associated with a cache for the memory.

SECOND EMBODIMENT WITH DCE FUNCTIONS INTEGRATED INTO DISK CACHE SUBSYSTEM/CACHE MANAGER

In the first embodiment of the present invention described above and illustrated in FIGS. 2 and 3, the DCE 22 operates independent of the cache manager 14 and thus is particularly suitable as an add-on or retrofit scheme. However, the functions of the DCE 22 would likely be performed more efficiently if they were integrated into the cache manager 14. Some advantages of an integrated scheme are as follows:

(1) The performance monitor statistics and the cache hit and miss detection functions of the conventional cache manager 14 can be directly used for determining the size of the variable read request, in place of the indirect scheme of FIG. 2 which is used to obtain the statistics and detect cache hits and misses. Thus, the time stamp 24 and performance monitor 26 of FIG. 2 may be eliminated.

(2) The first disk read can be dynamically sized based upon the algorithms described above. Thus, no second disk read or return of second data would be required and the second read requester 28 of FIG. 2 may be eliminated.

Figure 4:
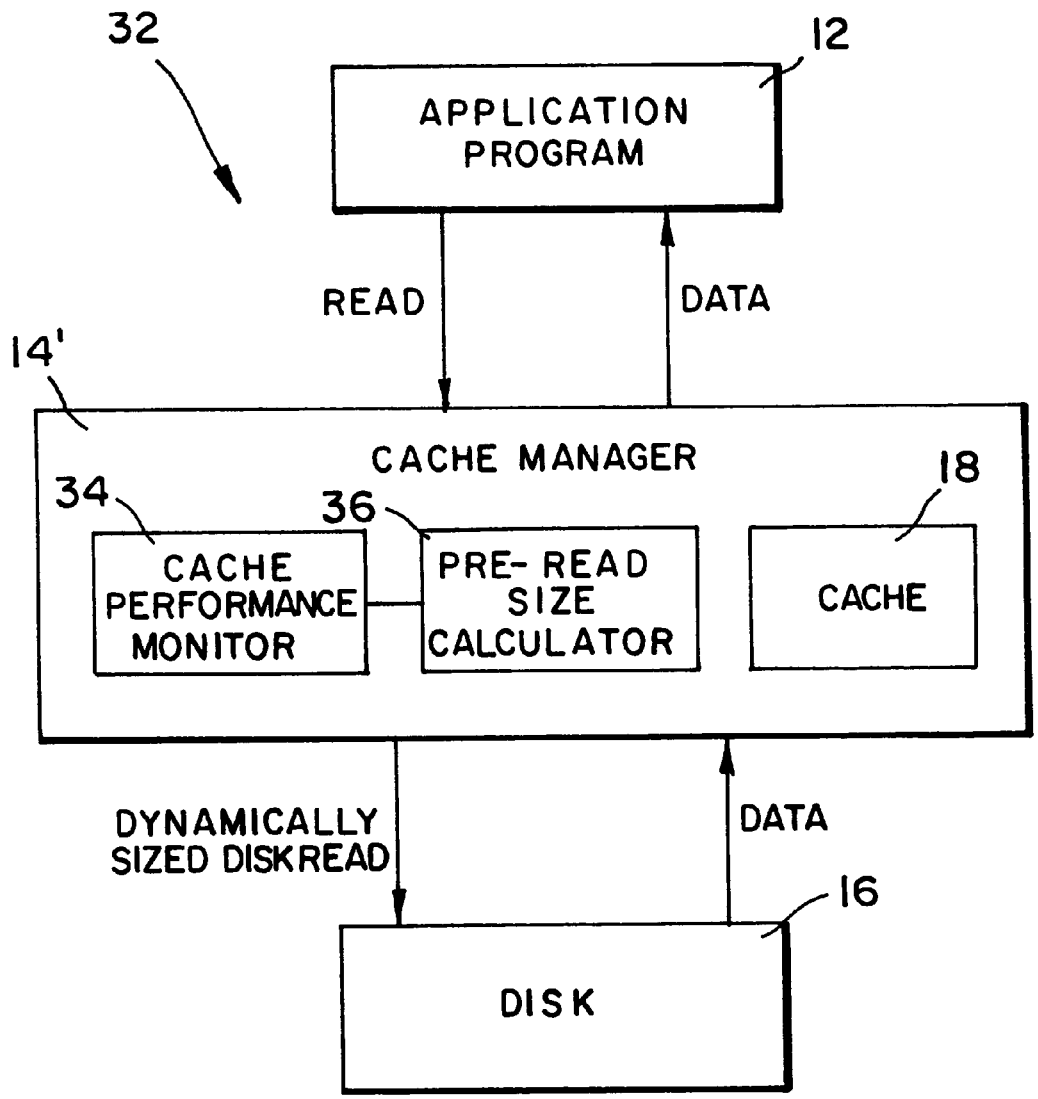
FIG. 4 is a schematic block diagram of a computer system using a disk caching scheme in accordance with a second embodiment of the present invention

FIG. 4 shows an integrated system 32. The system 32 is generally similar to the system 10 of FIG. 1, except that cache performance monitor 34 tracks short-term and long-term cache hit rates wherein a conventional cache performance monitor tracks only one cache hit rate. Furthermore, the cache manager 14' includes a pre-read size calculator 36 to determine a dynamically sized disk read wherein a conventional cache manager 14 outputs a fixed size disk read.

Although the present invention is preferably used with software cache or disk cache, the present invention may also be used in conjunction with other types of cache, such as cache memory or memory cache. For example, hardware cache is cache memory on a disk drive controller or a disk drive. The hardware cache stores frequently accessed program instructions and data, as well as additional tracks of data that a program might need next. A computer can access required data much more quickly from the hardware cache than from the disk. The data in the hardware cache is delivered directly to an expansion bus. A memory cache, sometimes called a cache store or RAM cache, is a portion of memory made of high speed static RAM (SRAM) instead of the slower and cheaper dynamic RAM (DRAM). In memory caching, data and instructions are cached in SRAM to minimize the need to access the slower DRAM. Memory caches may be internal (Level 1 (L1)) or external (Level 2 (L2)). In a memory cache scheme, the "storage device" would be the DRAM. The scheme disclosed in the present invention may be adopted for all of the above-noted caching processes.

The following Appendix is the source code for one suitable implementation of the first embodiment of the present invention.

It will be recognized by those skilled in the art that changes may be made to the above-described embodiments of the invention without departing from the broad inventive concepts thereof. It is understood, therefore, that this invention is not limited to the particular embodiments disclosed, but is intended to cover all modifications which are within the spirit and scope of the invention as defined by the appended claims.

What is claimed is:

1. A method of reading data in a computer system, the computer system including a disk and a disk cache in communication with the disk, wherein the computer system runs an application program which makes a first read request whenever it needs data to execute the program, the method comprising the steps of:

(a) tracking a disk cache hit rate of the computer system;

(b) detecting a request for data which is immediately requested by the computer system but which is not currently present in the disk cache;

(c) formulating a read request to obtain the requested data from the disk; and (d) dynamically sizing the read request based upon the current disk cache hit rate, wherein any data requested in the read request which is not the immediately requested data is located adjacent to the immediately requested data on the disk, wherein steps (a)–(d) are performed by:

(e) receiving the first read request in a disk cache enhancer and in a disk cache manager, the disk cache manager including disk cache which is the disk cache of the computer system;

(f) providing the requested data to the application program from the disk cache if the requested data is currently in the disk cache; and (g) formulating a second read request by the disk cache enhancer if the requested data is detected as not currently being in the disk cache, wherein the second read request is the dynamically sized read request of steps (c) and (d).

2. A method according to claim 1 wherein in step (d), the size of the read request is related to the disk cache hit rate in a manner such that the size of the read request is reduced as the disk cache hit rate declines, and the size of the read request is increased as the disk cache hit rate increases.

3. A method according to claim 1 wherein in step (g), the detecting of whether the requested data is currently in the disk cache is performed by monitoring the first read request response time.

4. A method according to claim 1 wherein the disk cache is divided into pages and the requested data includes pages of one or more program instructions and/or pages of data used by the one or more program instructions, and step (b) includes detecting a page fault.

5. A method according to claim 1 wherein any data requested in the read request which is not the immediately requested data is located logically adjacent to the immediately requested data.

6. A method according to claim 1 wherein in step (c), the initial size of the read request upon initiation of the computer system is greater than the size of the immediately requested data.

7. A method according to claim 6 wherein the initial size of the read request is about 1 megabyte greater than the size of the immediately requested data.

8. A method according to claim 6 wherein in step (c), the read request is a read-ahead request formulated to obtain the immediately requested data, plus additional data which is not immediately requested and which is located adjacent to the immediately requested data.

9. A method according to claim 6 wherein in step (c), the read request is a read-around request formulated to obtain the immediately requested data, plus additional data which is not immediately requested and which is located before and after the immediately requested data.

10. A method of reading data in a computer system, the computer system including a disk and a disk cache in communication with the disk, the method comprising the steps of:

(a) tracking a disk cache hit rate of the computer system;

(b) detecting a request for data which is immediately requested by the computer system but which is not currently present in the disk cache;

(c) formulating a read request to obtain the requested data from the disk; and (d) dynamically sizing the read request based upon the current disk cache hit rate, wherein any data requested in the read request which is not the immediately requested data is located adjacent to the immediately requested data on the disk, wherein the size of the read request is related to the disk cache hit rate in a manner such that the size of the read request is reduced as the disk cache hit rate declines, and the size of the read request is increased as the disk cache hit rate increases, wherein the tracking of the hit rate in step (a) includes tracking a short-term disk cache hit rate and a long-term disk cache hit rate, the size of the read request in step (d) being further dependent upon the short-term disk cache hit rate and the long-term disk cache hit rate, the short-term disk cache hit rate being used as the current disk cache hit rate to determine the reduction in the size of the read request, and the long-term disk cache hit rate being used as the current disk cache hit rate to determine the increase in the size of the read request.

11. A computer-readable medium whose contents cause a computer to read data in a computer system, the computer system including a disk and a disk cache in communication with the disk, wherein the computer system runs an application program which makes a first read request whenever it needs data to execute the program, the contents of the computer-readable medium, when executed, performing the steps of:

(a) tracking a disk cache hit rate of the computer system;

(b) detecting a request for data which is immediately requested by the computer system but which is not currently present in the disk cache;

(c) formulating a read request to obtain the requested data from the disk; and (d) dynamically sizing the read request based upon the current disk cache hit rate, wherein any data requested in the read request which is not the immediately requested data is located adjacent to the immediately requested data on the disk, wherein steps (a)–(d) are performed by:

(e) receiving the first read request in a disk cache enhancer and in a disk cache manager, the disk cache manager including disk cache which is the disk cache of the computer system;

(f) providing the requested data to the application program from the disk cache if the requested data is currently in the disk cache; and (g) formulating a second read request by the disk cache enhancer if the requested data is detected as not currently being in the disk cache, wherein the second read request is the dynamically sized read request of steps (c) and (d).

12. The computer-readable medium of claim 11 wherein the computer system runs an application program which makes a first read request whenever it needs data to execute the program, the method further comprising the steps of:

(e) receiving the first read request in a disk cache enhancer and in a disk cache manager, the disk cache manager including disk cache which is the disk cache of the computer system;

(f) providing the requested data to the application program from the disk cache if the requested data is currently in the disk cache; and (g) formulating a second read request by the disk cache enhancer if the requested data is detected as not currently being in the disk cache, wherein the second read request is the dynamically sized read request of steps (c) and (d).

13. The computer-readable medium of claim 11 wherein in step (g), the detecting of whether the requested data is currently in the disk cache is performed by monitoring the first read request response time.

14. The computer-readable medium of claim 11 wherein the disk cache is divided into pages and the requested data includes pages of one or more program instructions and/or pages of data used by the one or more program instructions, and step (b) includes detecting a page fault.

15. A computer-readable medium according to claim 11 wherein any data requested in the read request which is not the immediately requested data is located logically adjacent to the immediately requested data.

16. The computer-readable medium of claim 11 wherein in step (c), the initial size of the read request upon initiation of the computer system is greater than the size of the immediately requested data.

17. The computer-readable medium of claim 16 wherein the initial size of the read request is about 1 megabyte greater than the size of the immediately requested data.

18. The computer-readable medium of claim 16 wherein in step (c), the read request is a read-ahead request formulated to obtain the immediately requested data, plus additional data which is not immediately requested and which is located adjacent to the immediately requested data.

19. The computer-readable medium of claim 16 wherein in step (c), the read request is a read-around request formulated to obtain the immediately requested data, plus additional data which is not immediately requested and which is located before and after the immediately requested data.

20. A computer-readable medium whose contents cause a computer to read data in a computer system, the computer system including a disk and a disk cache in communication with the disk, the contents of the computer-readable medium, when executed, performing the steps of:

(a) tracking a disk cache hit rate of the computer system;

(b) detecting a request for data which is immediately requested by the computer system but which is not currently present in the disk cache;

(c) formulating a read request to obtain the requested data from the disk; and (d) dynamically sizing the read request based upon the current disk cache hit rate, wherein any data requested in the read request which is not the immediately requested data is located adjacent to the immediately requested data on the disk, wherein the size of the read request is related to the disk cache hit rate in a manner such that the size of the read request is reduced as the disk cache hit rate declines, and the size of the read request is increased as the disk cache hit rate increases, wherein the tracking of the hit rate in step (a) includes tracking a short-term disk cache hit rate and a long-term disk cache hit rate, the size of the read request in step (d) being further dependent upon the short-term disk cache hit rate and the long-term disk cache hit rate, the short-term disk cache hit rate being used to determine the reduction in the size of the read request, and the long-term disk cache hit rate being used to determine the increase in the size of the read request.

* * * * *